Nov. 29, 1960 J. J. LENTZ 2,962,681

SUPERCONDUCTOR CIRCUITS

Filed March 21, 1960 5 Sheets-Sheet 1

INVENTOR
JOHN J. LENTZ

BY John E. Dougherty Jr.
ATTORNEY

Nov. 29, 1960 J. J. LENTZ 2,962,681

SUPERCONDUCTOR CIRCUITS

Filed March 21, 1960 5 Sheets-Sheet 3

Nov. 29, 1960 J. J. LENTZ 2,962,681

SUPERCONDUCTOR CIRCUITS

Filed March 21, 1960 5 Sheets-Sheet 5

United States Patent Office 2,962,681

Patented Nov. 29, 1960

2,962,681

SUPERCONDUCTOR CIRCUITS

John J. Lentz, Chappaqua, N.Y., assignor to International Business Machines Corporation, New York, N.Y., a corporation of New York Filed Mar. 21, 1960, Ser. No. 16,399

26 Claims. (Cl. 338—32)

The present invention relates to superconductor circuits and, more particularly, to superconductor circuits fabricated in the form of transmission lines and including superconductor gate conductors which are selectively driven resistive to control the current in the circuits, wherein the resistance of the gate conductors is so related to the characteristic impedance of the transmission lines that optimum switching speeds are obtained.

In the majority of superconductor circuits shown in the prior art, switching, transfer and other memory functions are achieved by selectively introducing resistance into different ones of a plurality of current paths which are connected in parallel by a current source. In the circuits thus far proposed, the operating speeds obtainable have been limited by the L/R time constant of these circuits. This has been true for wire wound type circuits such as are shown and described in the article by D. A. Buck entitled "The Cryotron—A Superconductive Computer Component," which appeared in the Proceedings of the IRE, April 1956, as well as in the thin film type devices such as are shown and described in copending application Serial No. 809,815, filed on April 29, 1959, in behalf of John J. Lentz and assigned to the assignee of the subject application. The thin film type circuits are advantageous in that they have a lower inductance and a higher resistance than wire wound circuits and, therefore, exhibit a smaller time constant and higher speed of operation.

In accordance with the principles of the present invention, superconductive circuits are provided which are operable at higher speeds than has been heretofore possible. This higher speed is realized by designing superconductor circuits in the form of transmission lines. The transmission lines and the gate conductors for controlling the current in the lines are so chosen with respect to each other than the desired change in current distribution in the circuit when a gate is driven resistive is essentially completed in the time required for a wave to be propagated along the line and returned through the line to the gate which is driven resistive. In one of the embodiments of the invention, shown herein by way of example, a superconductor circuit is shown which is in the form of a superconductive loop which is mounted above a superconductive shield and insulated therefrom. The loop and shield form a transmission line, the characteristic impedance of which is determined by its distributed capacitance and inductance. Each of the gate conductors in the line is designed to have a resistance properly related to the impedance presented to the gate conductor when it is driven into a resistive state to produce current switching. In this illustrative embodiment, the gate conductor is so connected in the line that when it is driven resistive, the total impedance it sees is equal to twice the characteristic impedance of the line and, therefore, the gate conductor is designed to have a resistance which is substantially equal to twice the characteristic impedance of the line. Further embodiments of the invention are also shown, one of which employs a gate so connected that the impedance relationship required is that the gate resistance be equal to the characteristic impedance of the line.

In these preferred embodiments, the impedance of the transmission lines and the resistance of the gates are so related that each time a gate is driven resistive, it produces one or more waves in the line, each of which has associated with it a current substantially equal to one half the current in the gate at the time it is driven resistive. Each of these waves is propagated through the line and back to the gate and terminated at the gate the first time it comes back to the gate. As a result, complete current switching is obtained in the time required to propagate the wave through the line and back to the gate and this propagation, by proper design of the transmission line, may be made to take place at speeds approaching the speed of light.

In accordance with other embodiments of the invention, transmission line structures are shown which include control and gate conductors which are properly designed to provide impedance balancing in the transmission line and also to reduce the energy dissipation in the circuit to a minimum.

Therefore, it is a principal object of the present invention to provide improved high speed superconductor circuits.

It is a further object to provide superconductive circuits in the form of transmission lines which include gate conductors whose resistance, when driven into a resistive state, is properly matched to the impedance presented by the line to the gate conductor to achieve optimum switching speeds.

Still another object of the invention is to provide improved superconductive circuits including a plurality of current paths connected in parallel across a current source wherein the circuits are designed in the form of transmission lines with the gate conductors for switching the current in the circuit being properly matched to the impedance presented to the gate conductors by the line to achieve high speed switching.

It is still another object of the present invention to provide a circuit of the above described type wherein the geometry of the gate conductors, control conductors, and transmission line is such as to minimize reflections in the line.

Another object is to provide a circuit of the above described type wherein the characteristics of the gate conductors, control conductors and transmission line are such as to minimize the amount of energy dissipated by the circuit when it is operated.

Still a further object is to provide superconductive circuits in the form of transmission lines including one or more gate conductors exhibiting resistance equal to the characteristic impedance of the line.

Still another object is to provide superconductive circuits in the form of transmission lines including one or more gate conductors exhibiting resistance equal to essentially twice the characteristic impedance of the line.

The foregoing and other objects, features and advantages of the invention will be apparent from the following more particular description of preferred embodiments of the invention, as illustrated in the accompanying drawings.

In the drawings:

Fig. 1 shows one embodiment of a superconductor circuit constructed in accordance with the principles of the invention. This circuit includes a superconductive loop formed as a transmission line which includes gate conductors exhibiting resistances equal to twice the characteristic impedance of the transmission line.

Fig. 1*a* shows a series of waveforms illustrating the wave propagation in the circuit of Fig. 1 during a switching opertaion.

Figure 3A:
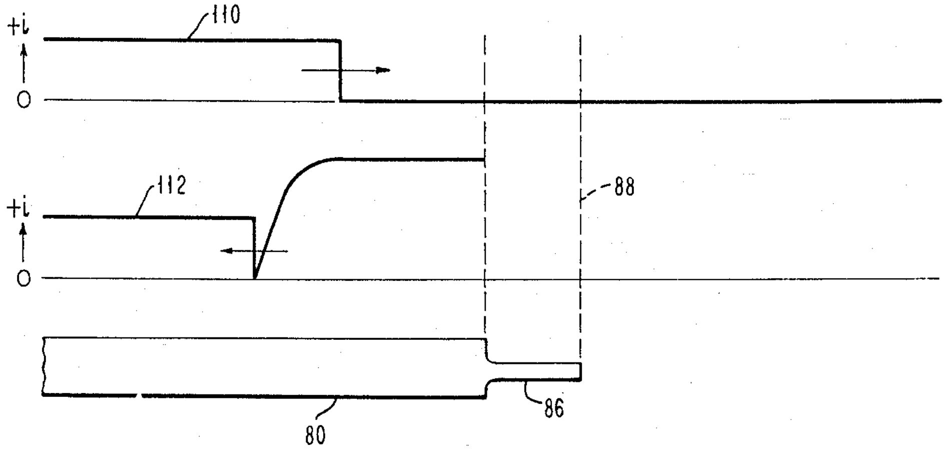
Fig. 3 shows a further embodiment of the invention including a gate connected in a superconductive loop wherein the resistance of the gate is equal to the characteristic impedance of the line.
Figure 3:
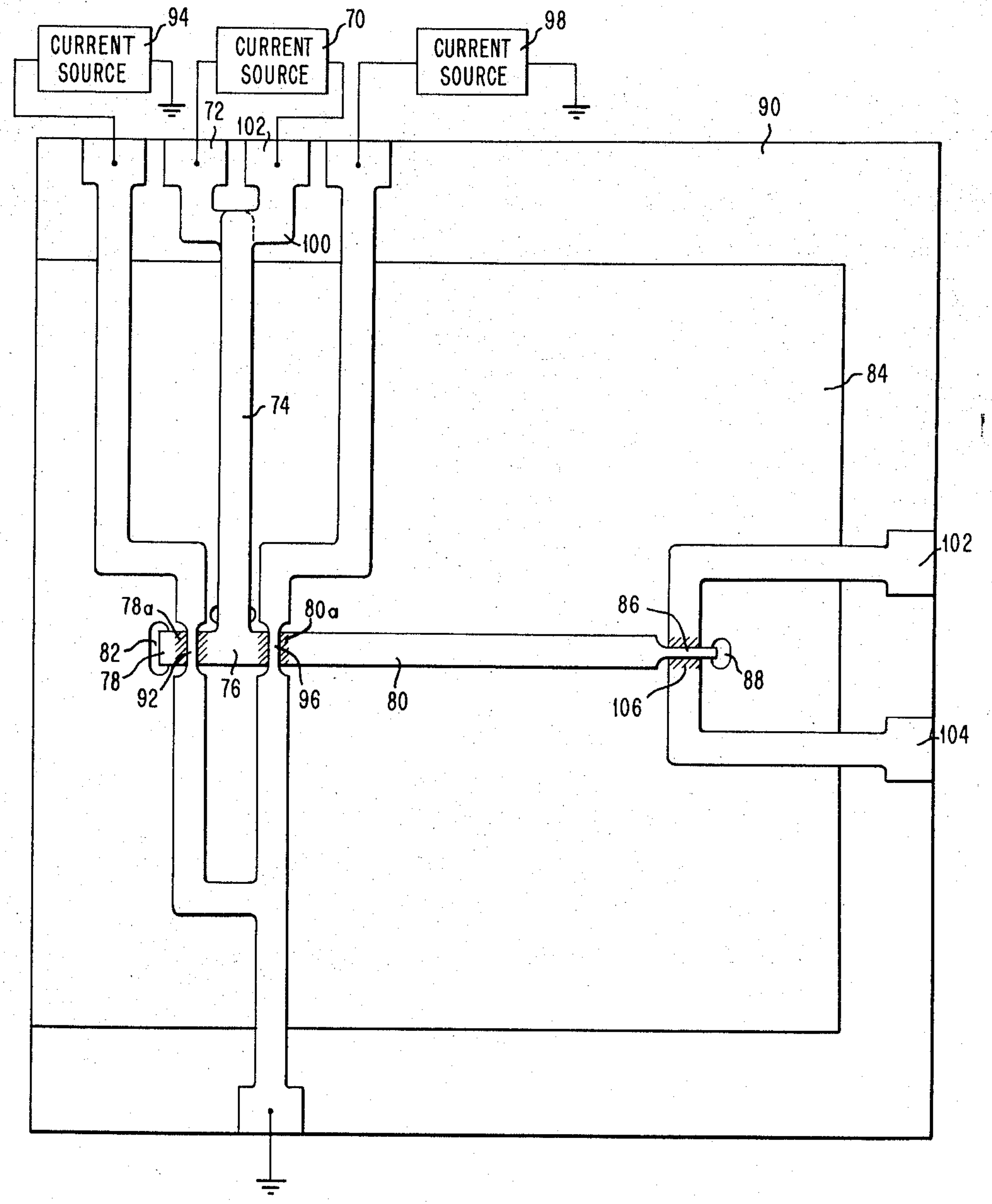

Fig. 3*a* shows a series of waveforms illustrating the wave propagation in the circuit of Fig. 3 during a switching operation.

Figure 4:
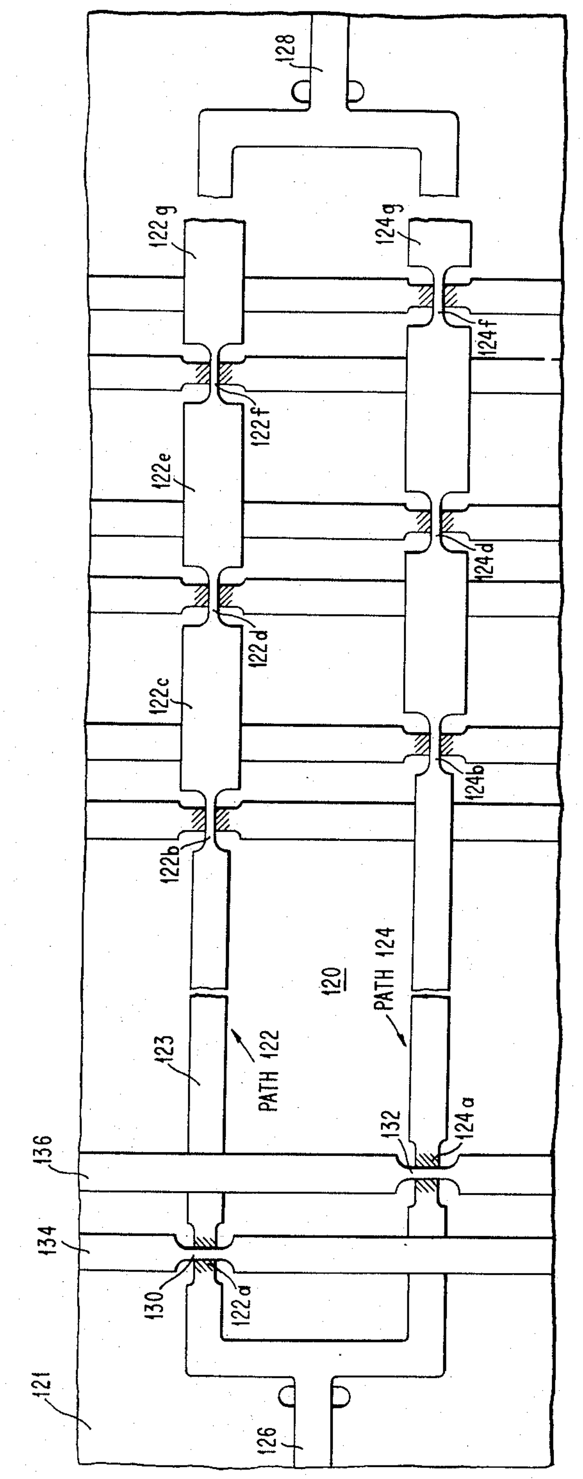

Fig. 4 shows a further embodiment of the invention in the form of a superconductive transmission line which includes a plurality of control conductors having different widths than the other portions of the line. This figure further illustrates the manner in which the gates in a transmission line are designed in order to minimize energy dissipation.

Figure 1:
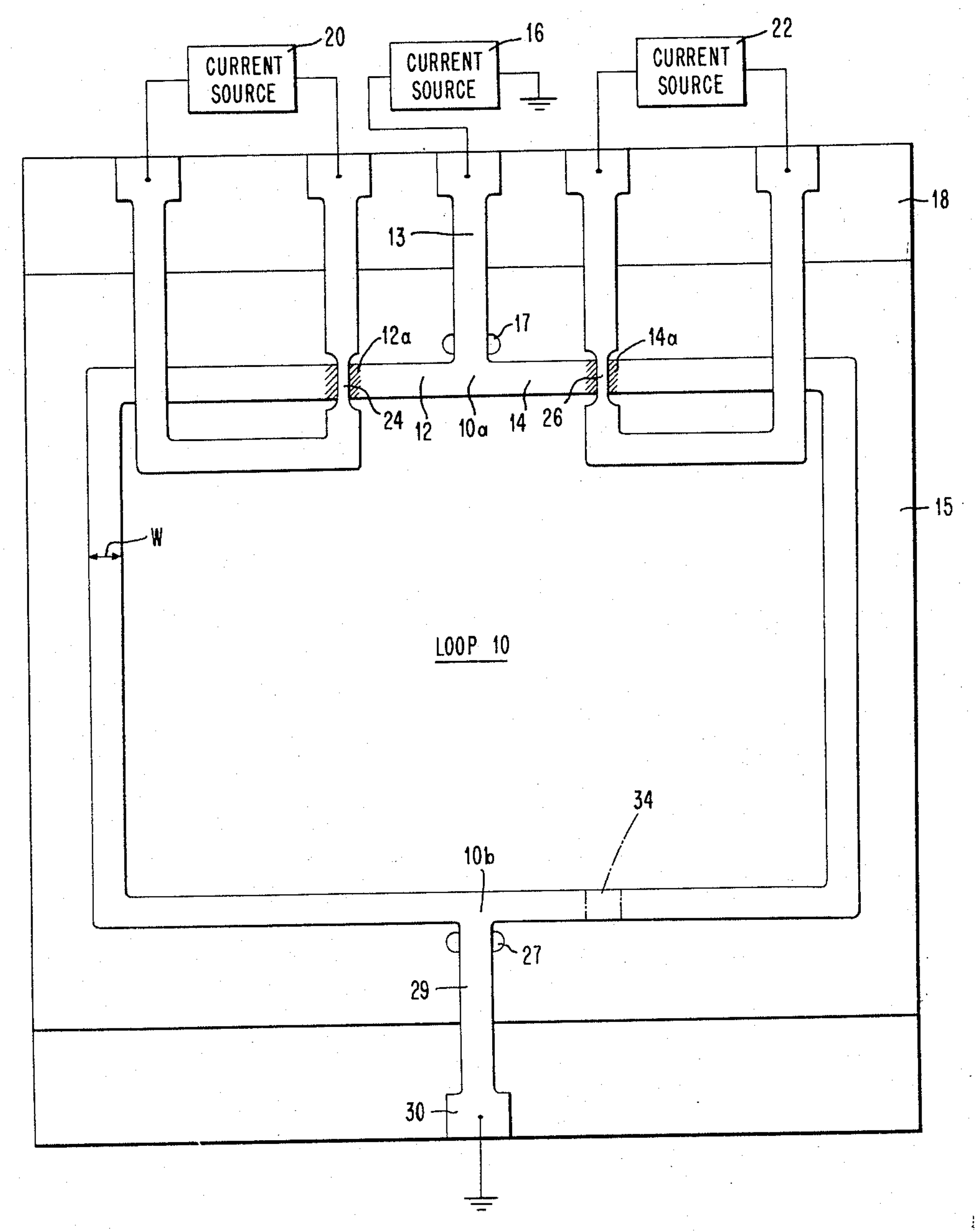

Referring now to the details of the figures, Fig. 1 shows a superconductor circuit laid down in the form of a transmission line wherein the resistance of the gate conductors are properly matched to the impedance of the transmission line to obtain optimum speed in switching. The circuit of Fig. 1 is formed by a superconductive loop 10 which includes two current paths designated 12 and 14 which are connected in parallel across a current source 16. The circuit is constructed in much the same manner as are the circuits shown and described in copending application Serial No. 809,815, cited above. Each of the paths 12 and 14 is provided with a superconductor gate conductor indicated at the shaded sections **12*a* and 14*a*. Each of the paths 12 and 14 is in the form of a planar strip laid down, preferably by vacuum evaporation techniques, on a superconductive shield 15 with the superconductor strips being insulated from the shield by a layer of insulating dielectric. The shield 15 is laid down on a substrate 18**.

The circuit of Fig. 1 may be operated as a bistable storage circuit which is switched between its stable states in response to signals applied by current sources 20 and 22. Current source 20 is effective when actuated to apply a signal to a circuit, also in thin film form, which includes a control conductor 24 for gate conductor **12*a*. The control conductor 24 is made narrower than the gate conductor 12 in order that the cryotron formed by these elements exhibits a gain greater than unity. Similarly, current source 22 supplies current to a planar circuit including a control conductor 26 which controls the state of gate 14*a*. One stable state of the circuit is represented when current from source 16 flows through path 12 and the second stable state when the current from this source flows through path 14. Actuation of control source 20, when the circuit is in a stable state with the current flowing in path 12, drives gate 12*a* resistive thereby causing the current to be shifted into path 14. Similarly, when current source 22 is energized at a time when the circuit is in a stable state with the current in path 14, the current is shifted to path 12 so that the circuit assumes its other stable state. Since the entire loop 10 is fabricated of superconductive material and maintained at a superconductive temperature, it is not necessary to maintain either of the sources 20 or 22 actuated once the desired switching of the supply current 16 has been accomplished. Thus, when the current has been switched to path 12 and neither of the current sources 20 and 22 is actuated so that gates 12*a* and 14*a* are both superconductive, the current remains in path 12. Similarly, once the current has been shifted to path 14 and the loop is allowed to go completely superconductive, the current remains in this path until resistance is introduced into the path by actuating current source 22**.

Examining the loop 10, formed by the planar thin strips shown, it can be seen that this loop, which is separated from the shield 15 by a thin layer of dielectric material, not shown, forms with the shield and the dielectric material, a transmission line. This transmission line formed by the loop 10, shield 15 and the dielectric therebetween, is, in Fig. 1, a smooth line of uniform geometry throughout. Since the line is fabricated of superconductor material, the characteristic impedance may be expressed as follows:

$Z_0=\sqrt{L/C}$; where
$L$=distributed inductance (henries/cm.); and
$C$=distributed capacitance (farads/cm.).

For the transmission line formed by the loop 10 and shield 15 in Fig. 1, the inductance may be expressed as follows:

$$L=4\pi\times10^{-9}\frac{t}{W}\left\{1+\frac{\lambda}{t}\left[1+ctnh\frac{d}{\lambda}\right]\right\}\text{(henries/cm.)}$$

$t$=thickness of the insulation separating the shield and the loop.
$W$=the width of the strips forming the loop.
$\lambda$=the penetration depth of the superconductive material at the operating temperature of the circuit; and
$d$=the thickness of the strips forming the loop.

The capacitance may be represented as follows:

$$C^1=\frac{\epsilon W}{4\pi t}\times\frac{1}{9\times10^{11}}\text{(farads/cm.)}$$

where $\epsilon$=the dielectric constant of the insulating material.

Each of the gates **12*a* and 14*a* is designed so that when it is driven resistive, its resistance is equal to twice the characteristic impedance $Z_0$ for the transmission line in which these gates are connected. Thus, when, for example, the current from source 16 is flowing in path 12 which includes a gate 12*a* and current source 20 is actuated to energize control conductor 24, gate 12*a* is driven resistive and introduces a resistance equal to twice the characteristic impedance of the transmission line into the transmission line. When the gate 12*a* is driven resistive, a voltage is produced across the gate. The amplitude of this voltage is determined by the magnitude of the current 16 and the resistance of the gate. Prior to the application of a signal by current source 20, the entire loop is superconductive and is at ground potential since the loop is connected to ground at land 30. The current source 16 is a constant current source and, therefore, there can be no change in the potential of the loop as a whole when gate 12 is driven resistive. Since the gate itself is not tied directly to ground, the voltage drop across the gate is produced in such a way that the midpoint of the gate is essentially at ground potential with equal voltage drops of opposite polarity extending from the midpoint of the gate to the opposite ends of the gate. As a result, waves are propagated from the gate 12*a* in both directions, both to the left and right along the transmission line formed by loop 10. Each of these waves has associated with it, a current. The current associated with the wave which propagates to the left through the remainder of path 12 reduces the current already in that path, and the current propagated to the right and through path 12 builds up a current in that path. These two waves travel at essentially the same speed and pass through each other at a meeting point indicated at 34. At this point the waves continue to pass through each other, with the wave propagated to the right from gate 12*a*, and in a clockwise direction with reference to loop 10, reaching the resistive gate 12*a*** at the same time as the wave propagated to the left, and thus in a counterclockwise direction. At this time when these waves are returned by the line to this resistive gate, both waves are terminated. This occurs since the portion of each wave which is transmitted through the gate is cancelled by the portion of the other wave which is reflected by the gate.

When this occurs, the entire current from source 16 has been completely shifted from path 12 to path 14 and the time required for this shift is the time required for a wave to propagate from the gate 12*a* along the line and back to this gate.

Figure 1A:
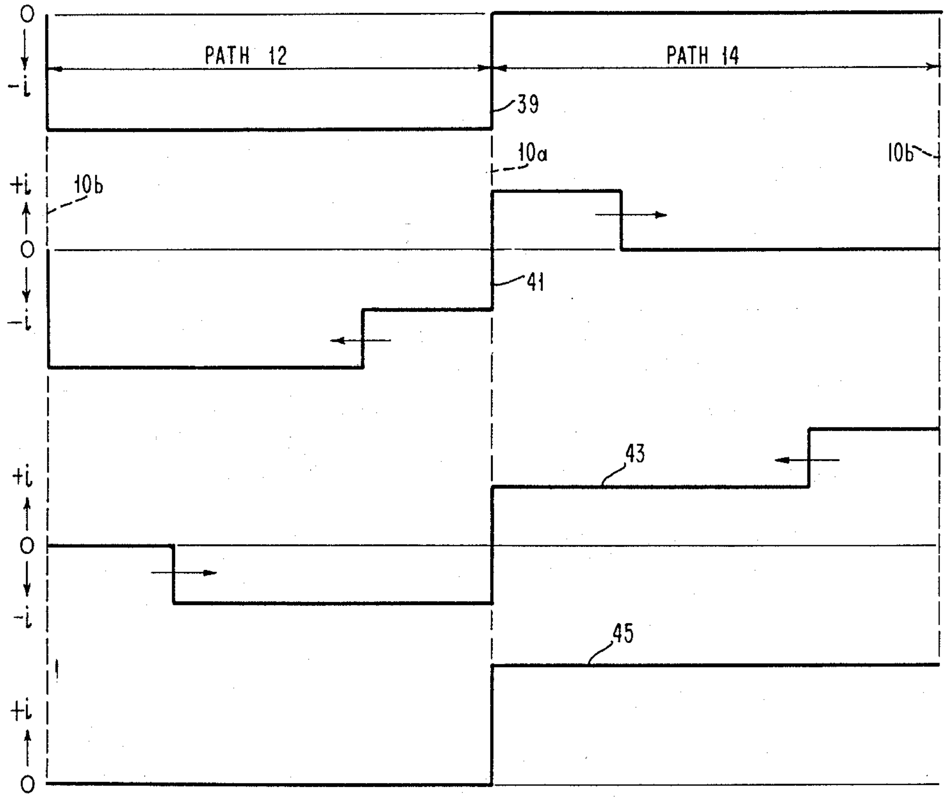

The manner in which this wave propagation takes place is indicated in Fig. 1*a*, which shows four waveforms illustrating the condition of the circuit before, during and after the switching is accomplished. The first of these waveforms is designated 39 and indicates the current distribution in the circuit prior to the energization of control conductor 24, at which time the entire current is in path 12. In order to simplify the explanation of the operation of this circuit, it is assumed for the wave diagrams of Fig. 1*a* that the gate 12*a* is located immediately adjacent the junction 10*a* of loop 10. This junction is represented by a dotted line 10*a*, shown in Fig. 1*a*. In Fig. 1*a*, the whole loop, instead of being shown closed, is shown developed to extend from left to right from the junction 10*a*, with either end corresponding to the point at which the two waves propagated from the gate, pass through each other. Assuming the gate to be located at junction 10*a*, this meeting point in loop 10 of Fig. 1 is located at 10*b*. In the wave diagram of Fig. 1*a*, counterclockwise currents, with respect to loop 10, are shown as negative currents and the clockwise currents as positive. Thus, as is indicated by waveform 39, prior to the energization of control conductor 24 to drive gate 12*a* resistive, the entire current from source 16 is in path 12, extending to the left from point 10*a* to 10*b* and there is no current in path 14, extending to the right from point 10*a* to 10*b*. When gate 12 is driven resistive, the midpoint of this gate remains at ground potential. Each half of the gate has a resistance value equal to the characteristic impedance of the transmission line. Therefore, each of the waves propagated from the gate has associated therewith a current which is equal to one half the magnitude of the current in the gate at the time it is driven resistive. The current associated with each of these waves is clockwise with respect to loop 10 so that, as is indicated by waveform 41 of Fig. 1*a*, immediately after gate 12*a* is driven resistive, the wave propagating to the left through path 12 reduces the magnitude of the current to one half the magnitude of the current supplied by source 16. The wave propagating to the right raises the current in path 14 to one half the magnitude of the current. These waves continue to propagate, pass through each other at point 10*b*, remembering the assumption that gate 12*a* is located immediately at junction 10*a*, and after passing through each other, continue until they reach gate 12*a*.

In the diagram of Fig. 1*a* when the waveform propagating to the left, as shown in the second of the waveforms designated 41, reaches the meeting point 10*b*, it is considered to enter at 10*b* at the right hand side of the diagram and proceed back to its starting point 10*a*, as shown by waveform 43. Similarly, when the wave propagating to the right, as shown in waveform 41, reaches meeting point 10*b*, it is considered, as in the subsequent waveform 43, to progress from point 10*b* on the left back to the starting point 10*a*. After the waveforms pass the meeting point 10*b*, the current associated with the wave propagating in path 14 builds up the current in that path to equal the current from source 16 and the current associated with the wave propagating in path 12 decreases the current in that path to zero. The two waves propagating in opposite directions in loop 10 are returned by the transmission line to gate 12*a* which is still in a resistive condition and are there terminated. When this occurs, that is, when the waves terminate themselves upon being returned to the gate 12*a*, the entire current from source 16 has been completely shifted from path 12 to path 14 as is indicated by waveform 45 of Fig. 1*a*. This current shift is accomplished in an extremely short time since the time required for the current shift is the time required for a wave to be propagated around the transmission line once. This wave propagation by proper choice of the material and thickness of the dielectric, the thickness of the strip conductors and shield, and the penetration depth of these superconductors, can be made to approach the speed of light. For a complete discussion of the speed of propagation in superconductor transmission lines, reference may be made to copending application Serial No. 16,431, filed March 21, 1960, in behalf of D. R. Young and J. Swihart, and assigned to the assignee of the subject application.

The circuit of Fig. 1, using cryotron gates exhibiting a resistance equal to twice the characteristic impedance of the transmission line in which they are connected, may also be employed as a persistent current circuit, capable of extremely high speed operation. For example, persistent current may be stored in loop 10 by energizing control conductor 24 to drive gate 12*a* resistive and shift the entire current from the source into path 14. After the current shift has been accomplished as described above, gate 12*a* is allowed to become superconductive and the current from source 16 is terminated, causing a clockwise persistent current to be stored in loop 10. A detailed description of the manner in which persistent currents are stored in such a loop is found in copending application Serial No. 861,392, filed December 22, 1959, in behalf of D. R. Young, and assigned to the assignee of the subject application. If the paths 12 and 14 are of equal inductance, the magnitude of the stored current is equal to one half the magnitude of the source current 16. The presence of a stored current in this loop may be employed to indicate an information value. When it is desired to quench this persistent current, control conductor 24 is again energized to drive gate 12*a* resistive. Waves are propagated in both directions from the resistive gate in much the same manner as described above. The current magnitude of each wave is equal to one half the current flowing through the gate at the time it is driven resistive. The persistent current in the gate at the time it is driven resistive is flowing in a clockwise direction and the current associated with each of these propagating waves is in a counterclockwise direction. These waves in propagating around the loop, pass through each other at meeting point 10*b* and then continue back at the resistive gate 12*a*, quenching the entire persistent current in loop 10.

In order to prevent the waves propagated in loop 10 from dividing at junctions 10*a* and 10*b* and propagating in the lines formed between conductors 13 and 29, which connect the loop to the current terminals, and the shield, each of these lines is made to present a high impedance at these junctions compared to the impedance presented by the loop transmission line. This is accomplished, for example, by providing openings such as are shown at 17 and 27 in the shield and/or making conductors 13 and 29 very narrow.

Figure 2:
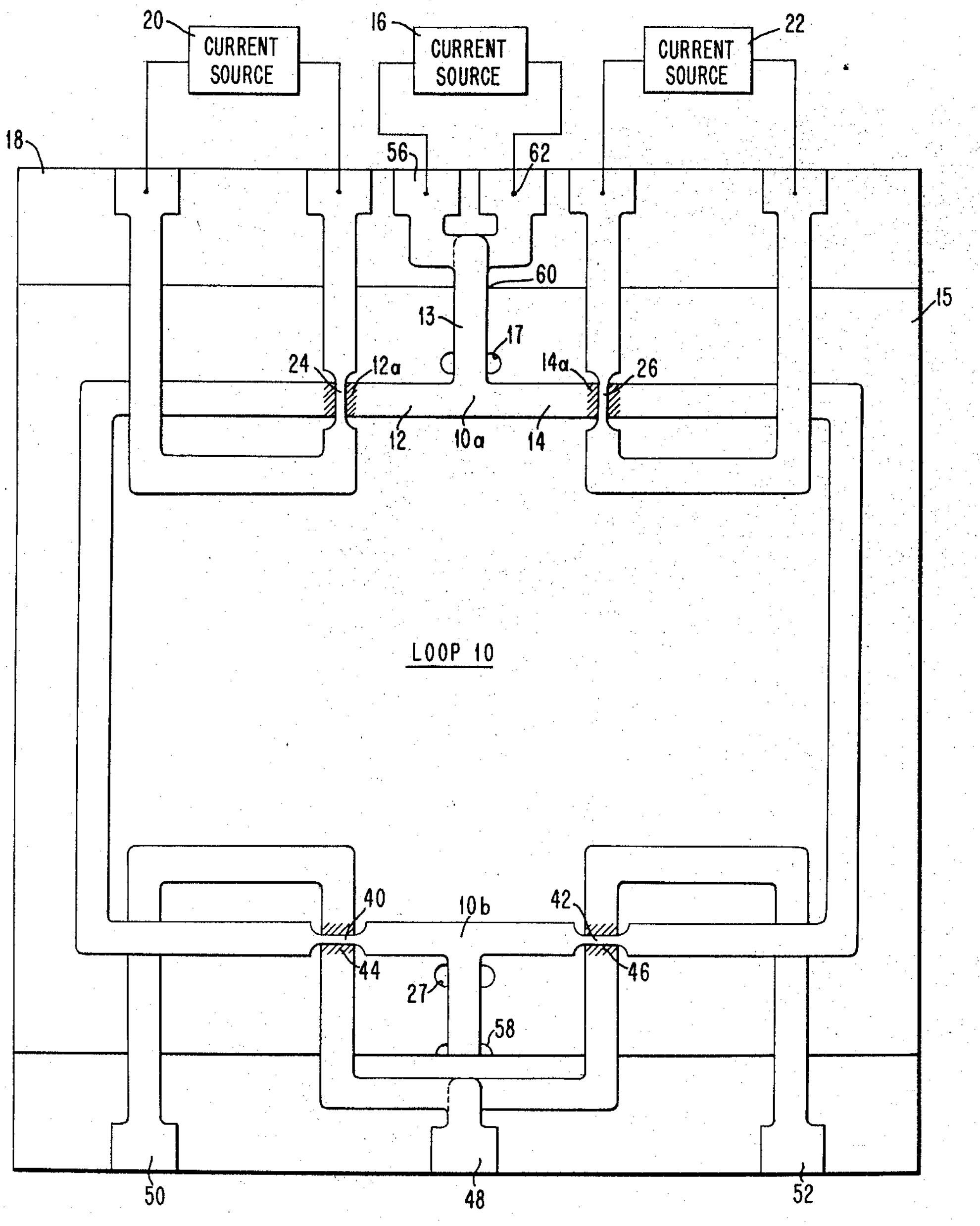
Fig. 2 shows an embodiment similar to that of Fig. 1 which also includes an output circuit responsive to control conductors connected in the transmission line.

In order to sense the presence or absence of a persistent current in loop 10, or to determine the one of the legs 12 or 14 in which current from source 16 is flowing, control conductors are connected in one or both of the paths in the loop and these control conductors control cryotron gate conductors connected in the output circuitry for the loop. Fig. 2 shows such a circuit provided with an output circuit for sensing the state of loop 10. Since the circuit of Fig. 2 is, in most respects, similar to that of Fig. 1, like components in both circuits are identified with the same reference numerals. The loop 10 of Fig. 2 is, however, provided with control conductors for two output cryotrons. A control conductor 40 is connected in path 12 and a further control conductor 42 is connected in path 14. Control conductor 40 controls a gate conductor 44 and control conductor 42 controls gate conductor 46. Gate conductor 44 is connected in a circuit extending between a pair of lands 48 and 50 and gate conductor 46 is connected between land 48 and another land 52. The output for the loop 10 may be taken at lands 48, 50 and 52. For example, when the circuit is in its first stable state with the current from source 16 in path 12, control conductor 40 drives gate conductor 44 resistive so that a resistance is present between terminals 48 and 50 and there is no resistance between terminals 48 and 52. When the circuit is in its other stable state with the current in path 14, gate 46 is driven resistive by control conductor 42 so that resistance is manifested between terminals 48 and 52 and there is no resistance between terminals 48 and 50. It is, of course, apparent to those skilled in the art that the gates 44 and 46 may be connected in further superconductor circuits in which current from a source is directed through one or the other gate in accordance with the state of the loop 10. When the loop 10 is employed as a persistent current loop, the gain of the output cryotrons formed by gates 44 and 46 and control conductors 40 and 42 may be such that one or both of these gates is driven resistive when a persistent current is stored in the loop.

The connections from the source 20 to control the state of gate 12*a* and from the source 22 to control the state of 14*a* are the same in the circuit of Fig. 2 as in that of Fig. 1. The current supply circuit from source 16 to loop 10 is somewhat different in Fig. 2. The current in the embodiment of this figure is directed from one terminal of the current source 16 to a land 56 on substrate 18 from which a conductor extends to junction 10*a* in loop 10. The circuit is completed through paths 12 and 14 to junction 10*b* of loop 10 from which a conductor extends to a point 58 at which a connection is made to shield 15. The current is then returned in the shield imaging the pattern of the current in the loop and is taken from the shield at a point 60, from which a conductor extends to a land 62 which is, in turn, connected to the other terminal of current source 16. This type of connection between the shield and the circuits on the shield is shown and described in the above mentioned copending application Serial No. 809,815, and this type of connection, as well as that shown in Fig. 1, may be used in practicing the principles of the invention. The operation of the circuit of Fig. 2 is essentially the same as that of Fig. 1, the only difference being caused by the presence of the control conductors 40 and 42 in loop 10. These control sections, being narrower than the remaining sections of the loop, produce reflections as waves are propagated therethrough. However, since there are only two of these control conductors, these reflections raise no serious problems, as will become clear from the description of the invention with respect to the embodiment of Fig. 2 and those of Figs. 3 and 4.

Turning again to the embodiment of Fig. 2 and assuming that the current from source 16 is originally in path 12 and that the gate 12*a* is driven resistive by actuating current source 20, two waves are propagated from the resistive gate with one wave propagated to the left (counterclockwise) reducing the current in path 12 and the other wave propagating to the right (clockwise) and increasing the current in path 14. The output cryotrons formed by control conductors 40 and 42 and gates 44 and 46 are located in the loop symmetrically with respect to the input cryotrons formed by control conductors 24 and 26 and gates 12*a* and 14*a*. By this it is meant that the distance between gate 12*a* and control conductor 46, measured in either direction around the loop is the same and, similarly, the distance from gate conductor 14*a* to conductor 40. Thus, when gate conductor 12*a* is driven resistive and waves are propagated in both directions therefrom in the transmission line, these waves first meet at control conductor 46. As a result, the current in the control conductor is increased from zero to the value of the current supplied by source 16 in the time it takes for a wave to propagate half way around the loop. Shortly before this, the wave propagated in a counterclockwise direction passes through the control conductor 40, decreasing the current therein by one half.

If the design of the output cryotrons is such that the current required by the controls 40 and 42 to drive their associated gates 44 and 46 resistive, is greater than one half the source current, it can be seen that gate 46 is driven resistive in essentially one half the time it takes to switch the circuit completely from one stable state to the other and gate 44 is allowed to become superconductive in a slightly shorter time. Thus, where this mode of operation is practiced, it is desirable that the input and output cryotrons be symmetrically located in the transmission line. If the characteristics of the output cryotrons are such that each of the control conductors 40 and 42 require only half of the current from source 16 to drive the associated gate resistive, the time sequence is essentially the same as far as driving gate 46 resistive is concerned, however, the gate 44 remains resistive until shortly after gate 46 is driven resistive. Thus, it can be seen that the time required to change the state of the output gates controlled by the control conductors varies in accordance with the position of the control conductors in the loop and the portion of the supply current required by these control conductors to drive the output gate conductors resistive. Another important thing to note with reference to the operation of the output cryotrons of the circuit of Fig. 2 is that the signals build up in the control conductors 44 and 46 very quickly. Thus, examining again Fig. 1*a*, it can be seen that the current in the output control conductor 42 builds up quickly to a full value of the supply current as the waves propagating in both directions in the loop simultaneously pass therethrough. The important thing to note, and this is true regardless of whether or not the output cryotron is symmetrically located with respect to the input cryotron, is that the current in the control conductor rises sharply either to the full value of the source current in one step or sharply to one half the value of the supply current and then to the full value of the supply current in two short steps. The current does not build up in a series of small steps, as is the case with conventional cryotron circuits. As a result, even though the output cryotrons may have a fairly broad transition, they can be driven almost instantaneously between superconductive and resistive states. This is an important consideration when a series of circuits such as are shown in Fig. 2 are connected with one driving the other, since it preserves the shape of the pulses transmitted from circuit to circuit.

Fig. 3 shows a further embodiment of the invention in the form of a superconductive transmission line circuit including two parallel paths wherein the current is shifted from one path to the other under control of a gate conductor which, when driven resistive, exhibits a resistance having a magnitude substantially equal to the characteristic impedance of the transmission line. This circuit receives its supply current from a source 70 having one of its terminals connected to a land 72. A thin film strip extends from land 72 via conductor 74 to a junction 76 from which there extend in parallel a path 78 and a longer path 80. Path 78 includes a gate conductor 70*a* and path 80, a gate conductor 80*a*. The strip forming path 78 is connected at 82 to a shield 84 on which the circuit is mounted. Similarly, path 80, which also includes a control conductor 86, is connected to shield 84 at point 88. The remainder of the circuit connected to supply source 70 is insulated from shield 84. The shield itself is mounted on a substrate 90. The cryotron gate 78*a* is controlled by a control conductor 92 which receives current from a current source 94. Gate conductor 80*a* is similarly controlled by a control conductor 96 which receives current from a source 98.

One terminal of the supply source 70 is connected to land 72, from which point the circuit extends via conductor strip 74 to a junction 76 and then in parallel through paths 78 and 80. The circuit is completed through the shield plane 84 in a path imaging the path in which the current is flowing in the strips 74 and 80 or 78, back to a conductor 100. This conductor extends from shield 84 to a land 102 which is, in turn, connected to the other terminal of current source 70. The current from source 70 may be directed either through path 78 or path 80 by selectively actuating current sources 94 and 98. Assuming that the current from source 70 has been directed into path 78 by actuating current source 98 to drive gate 80*a* resistive, the operation is now described when source 94 is actuated to drive gate conductor 78*a* resistive. When this gate conductor is driven resistive with the source current flowing in the gate conductor, a voltage is developed across the gate, the amplitude of which depends upon the magnitude of the source current and the magnitude of the resistance of the gate. Since the gate is connected directly to the shield at point 82, it sees only a single section of transmission line extending to the right, formed by path 80 and the portion of the shield 84 beneath this path. Path 74 which extends back to the current source appears as an open circuit. Therefore, when gate 78*a* is driven resistive, a wave is propagated to the right along the transmission line formed by path 80 and the shield 84. Since only a single wave is propagated, the total impedance presented to gate 78*a* is essentially the characteristic impedance of the transmission line and, therefore, this gate is designed to have a resistance equal to the characteristic impedance of the transmission line. The wave applied to the transmission line propagates to the right, passing through the control conductor 86 to the point 88, at which point the strip forming path 80 is connected to shield 84. This point actually represents a shorted termination of the line so that a wave is reflected back along the line which propagates until it reaches gate 78 at which point the wave propagation is terminated. Since the resistance of gate 78*a* is equal to the characteristic impedance of the transmission line and it causes a wave to be propagated only on a single line, the magnitude of the current associated with the wave propagated from the gate is essentially equal to one half the current through the gate at the time it is driven resistive. When this propagating wave reaches the shorted termination at 88, a doubling effect is achieved, and as the wave proceeds back the current is raised first in the control conductor 86 and then, building up from right to left, to the value of the current supplied by source 70 in the entire path 80. When the wave is returned by the transmission line to gate 78*a*, it is terminated, at which time the entire current has been shifted from paths 78 to path 80.

A similar type of operation may be employed to shift the current back to path 78. The gate 80*a* is positioned in the line as shown, close to junction 76, so that the space between gate 80*a* and point 82 at which a connection is made to shield 82 is extremely small compared to the space between gate 80*a* and the point 88 at which the other end of the strip is connected to the shield. The resistance of gate 80 is also equal to the characteristic impedance of the line. However, it is also possible to design the circuit so that gate 80*a* is located midway between the points 82 and 88, in which case it would be proper for the best speed in switching the current from path 80 to 78, to design gate 80*a* to have a resistance equal to twice the characteristic impedance of the line, since with the gate positioned at the midpoint of the line, when it is driven resistive, it causes waves to be propagated in both directions. Each of these waves has associated with it a current equal to one half of the current passing through the gate when it is driven resistive only if the gate has a resistance equal to the total of the impedances of the two sections of the line on which it causes waves to be propagated. These two waves propagate until they reach the terminals 88 and 82 at which point a doubling effect is achieved and they are reflected and propagated back to the gate 80*a* where they arrive simultaneously and are terminated.

The output of the circuit of Fig. 3 is manifested between a pair of terminals 102 and 104. A gate 106 is connected between these two terminals. This gate is in a superconductive state when current from path 70 is in path 78 and is in a resistive state when the current from this source is in the path 80 in which the control conductor 86 is connected.

Since the width of the control conductor 86 is different from the width of the smooth portion of path 80, this output control conductor produces a discontinuity in the line in much the same manner as the control conductors of the circuit of Fig. 2. However, a single discontinuity does not raise much of a problem as may be understood by a consideration of Fig. 3*a*, which illustrates the type of reflection produced when a wave propagating along the transmission line passes from the smooth portion of the line 80 to the narrow control conductor 86. In Fig. 3*a*, two wave forms 110 and 112 show the manner in which the waves progress when gate 78*a* in path 78 is driven resistive at a time when the current from source 70 is in this path. Wave 110 shows the manner in which the wave is propagated from this gate to the right along the transmission line and indicates the condition of the line at a time before the wave has reached control conductor 86. When the wave reaches the control conductor 86, a negative reflection is produced, and this reflection is immediately followed by a wave built up by multiple reflections within conductor 86. This is illustrated by the waveform 112 which indicates the manner in which the wave is propagated to the left and shows the condition sometime after the reflections take place. This wave continues to propagate to the left until the entire current from source 70 is built up in path 80.

Fig. 4 shows a further embodiment of the invention illustrating the manner in which the inventive principles are applied to a circuit wherein the transmission line necessarily includes a large number of sections having different geometry. The basic circuit of Fig. 4 is a transmission line formed by a loop 120 mounted above a shield 121. Loop 120 includes two parallel current paths 122 and 124. Current is supplied to the loop by a current source, not shown, connected to the junction 126 in the loop and then proceeds via either path 122 or 124 to a further junction 128. This junction is connected through further circuitry to the other terminal of the current source. Path 122 is provided with a gate conductor 122*a* and path 124 with a gate conductor 124*a*. The state of the gate conductors 122*a* and 124*a* is controlled by control conductors 130 and 132, respectively. The circuit is switched between the stable states by selectively applying signals to one or the other of paths 134 and 136, in which these control conductors are connected. Examining the paths 122 and 124 in detail, and the former path as illustrative, it can be seen that this path includes the gate conductor 122*a* and then a section of smooth line 123, which may be rather long, extending from this gate conductor to the first of a number of control conductors designated 122*b*. The path is shown to include two other control conductors 122*d* and 122*f*. Following each control conductor in the line is a section of the line which is wider than the smooth section of the line 123 connecting the gate conductors 122*a* and 122*b*. These wider sections are designated 122*c*, 122*e* and 122*g*. The smooth section 123 of the line between gate conductor 122*a* and control conductor 122*b* has characteristic impedance which properly matches the resistance of gate 122*a* for high speed operation. The narrower control sections 122*b*, 122*d* and 122*f* are necessary to control a number of output circuits in accordance with the state of loop 120. In order to minimize any reflections due to these discontinuities, the narrow control sections are arranged as shown, rather close together, and the distance between these control sections is small compared to the wavelength of the highest frequency signal which is to be transmitted down the transmission line. The wider sections 122*c*, 122*e* and 122*g* are provided after each narrow section so that each pair, taken together, exhibits a characteristic impedance equal to the characteristic impedance of the smooth sections of the line. A similar plurality of control sections is include in path 124, with each narrow control section being followed by a wide section to provide proper impedance balancing in the line. The break lines immediately following the wide section 122g, in path 122, and the last wide section 124g, in path 124, indicate that any number of control conductors iterately arranged as shown might be included in either path. The final portion of each path is shown to have the width of the smooth line which may be of any length and completes the path to junction 128.

Each of the control conductors 122b, 122d and 122f in path 122 controls a gate connected in a circuit which is controlled by loop 120. Similarly, gates in other paths also controlled by the current distribution in loop 120 are controlled by the control sections 124b, 124d and 124f which are connected in path 124. The current paths in which these gates controlled by these control sections are connected may illustratively be part of a matrix switch, the function of which is to address a superconductor memory. Another distinctive feature of the circuit of Fig. 4 is that the gates 122a and 124a are actually narrower than the sections of the smooth transmission line to which they are connected. The reason for this type of arrangement is that the cryotrons formed by the controls and gates are preferably as small as possible, since the smaller these elements are, the less is the energy dissipation in the circuit when these devices are operated. The gain of a cryotron is proportional to the ratio of the width of the gate conductor to the width of the control conductor. Thus, taking as an example, the input cryotron in path 122, its gain is proportional to the ratio of the width of the gate conductor 122a to the width of the control conductor 130. Since the gain is proportional to the ratio of these widths, both the gate and conductor may be both made bigger or smaller in proper proportions and still achieve the same gain. However, the amount of energy dissipated in the circuit, when the cryotron is operated, is proportional to the electromagnetic energy supplied when the control conductor is energized. The amount of this energy is proportional both to the inductance of the circuit and to the square of the current which is applied to the control section to drive the gate resistive. Therefore, by making the control as narrow as possible, though the inductance is raised, the current required in the control to drive the gate resistive is lowered and, therefore, the energy dissipation is lowered. Thus, once the gain is determined, the cryotron control should be made as narrow as possible and the gate in proper proportion. Similarly, since the portion of the gate conductor which is driven resistive, when the control is energized, is the volume of the gate conductor immediately beneath the control conductor, the total resistance introduced in a gate conductor is the same as long as the ratio of control width and gate width is maintained the same. Assuming a given dielectric, dielectric thickness and an operating temperature, gate material and gate thickness, the width of the smooth sections of the line for proper impedance matching is a function of the ratio of the width of the gate conductor to that of the control conductor. Therefore, the current relationship may be realized with cryotrons of different sizes. The gate may, as shown in Figs. 1 and 2, be designed to be the same width as the smooth sections of the elements, but it is preferable in order to minimize energy dissipation to design the gate and control as small as possible as indicated in Fig. 4. The operation of the circuit of Fig. 4 is essentially the same as that of Figs. 1 and 2. For example, assume that the source current in the loop 120 is initially in path 122 and a current signal is applied to path 124 to drive input gate 122a resistive. The resistance of this gate is essentially equal to twice the characteristic impedance of the transmission line formed between the paths 122 and 124 and superconductive shield 123. This is so since, in this embodiment, as in those of Figs. 1 and 2, the total impedance seen by the gate when it is driven resistive is the total of the impedances of the two sections of transmission line connected to the gate. Thus, when the gate 122a is driven resistive, waves are propagated in opposite directions from this gate around the loop with each of these waves having associated with it a current equal to one half the current flowing in the gate at the time it is driven resisitive. These waves pass through each other and eventually are terminated when they are returned by the transmission line to the resistive gate 122a at which time the entire current has been switched from path 122 to path 124. With the current in this latter path, the gates in the output circuit controlled by the control sections 122b, 122d and 122f in path 122 are superconductive and those controlled by the control sections 124b, 124d and 124f connected in path 124 are resistive.

Each of the circuits, disclosed herein by way of illustrating the application of the inventive principles to fabricate improved super-conductor circuits, is in the form of a transmission line including superconducting gate conductors which are driven resistive to cause a change in current distribution in the line. In each case, the resistance of the gate is that required to produce the optimum speed of operation. This resistance is determined not only by the characteristic impedance of the line in which the gate is connected but by other factors including the particular location in the line where the gate is connected, the actual total impedance presented to the gate when it is driven resistive, and the mode in which the line is excited by the gate when it is driven resistive. In each case, the design is such that each wave applied to the line when the gate is driven resistive has associated with it a current which is essentially equal to one half the current in the gate at the time it is driven resistive. The inventive principles disclosed may be applied in constructing not only structures of the type herein disclosed but also many other types of structures. For example, the inventive principles may be applied to doubly shielded structures, such as are shown in copending application Serial No. 809,815, cited above, in which case the inductance of the transmission lines is reduced, as well as bifilar circuits such as are shown and described in copending application Serial No. 824,120, filed on June 30, 1959, in behalf of John J. Lentz, and assigned to the assignee of the subject application.

Another important thing to note about circuits constructed in the manner shown in Figs. 1, 2, 3 and 4 is that the resistance values of the gates may vary slightly from the ideal with little or no loss in switching speed, and therefore, production tolerances are less stringent. Thus, for example, in the circuit of Fig. 2, the resistance value of gate 12a might be slightly less than the value of twice the characteristic impedance of the transmission line in which it is connected. In such a case, the waveforms transmitted in both directions from the gate along the transmission line have associated with them currents that are slightly less than one half the magnitude of the current flowing through the gate at the time it is driven resistive. The important consideration is that the current required to be switched is switched in the time required for the wave to propagate down the line and back to the gate.

Another important thing to note concerning these circuits is that, in most cases, it is desirable to minimize the amount of current necessary to be applied by the supply source to the circuit. Thus, for example, referring again to Fig. 2, it is preferable to design the circuit so that control conductors 40 and 42 drive the gate conductors 44 and 46 resistive only when the current in these control conductors is a substantial portion, that is, more than half of the current supplied by the supply source. With this type of operation, it can be seen that for the same design of the output cryotrons, a much smaller supply current can be utilized. This is an important consideration since one of the problems in designing superconductor circuits on a large scale basis is heat dissipation, and the amount of heat dissipation is proportional to the square of the magnitude of the current passing through the gate at the time it is driven resistive.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A superconductor circuit comprising; first and second strips of superconductive material forming a closed superconductive loop; a superconductive shield adjacent said strips and separated therefrom by a layer of dielectric material, said superconductive strips, shield, and dielectric material therebetween forming a transmission line; a superconductive gate conductor; said superconductive gate conductor forming a portion of one of said strips; said superconductive gate conductor being in a superconducting state; and control means effective when energized to cause said gate conductor to be driven into a resistive state; the magnitude of the resistance of said gate conductor when it is driven into a resistive state being substantially equal to the total impedance presented by said transmission line to said gate conductor at the time it is driven into a resistive state.

2. The invention of claim 1 wherein the resistance of said gate conductor is substantially equal to twice the characteristic impedance of said transmission line.

3. A superconductor circuit comprising; first and second superconductive paths; each said path including a superconductive gate conductor and each said gate conductor being provided with control means for controlling it between superconducting and resistive states; a current source; said first and second current paths being connected in parallel circuit relationship with respect to said current source whereby current from said source is selectively directed to one or the other of the two paths under control of the control means for controlling the state, superconducting or resistive, of said superconductive gate conductors; said superconductive paths being in the form of a transmission line; the magnitude of the resistance of each of said gate conductors being substantially equal to the total impedance presented to the gate conductor by the transmission line when it is driven into a resistive state by its control means at a time when the current from the source is being directed therethrough.

4. A superconductor circuit comprising; first and second superconductive current paths connected in parallel across a current source; first and second gate conductors connected in said first and second current paths, respectively; first and second control conductors each for driving a corresponding one of said first and second gate conductors from a superconducting to a resistive state; said first and second paths being in the form of a planar superconductive strips laid down adjacent a planar superconductive shield and insulated therefrom by a layer of dielectric material to form a transmission line having a predetermined characteristic impedance; means for energizing either of said control conductors when the current from said source is being directed to the gate conductor which it controls to cause that gate conductor to be driven resistive; said gate conductor when driven resistive applying to each section of the transmission line to which it is connected a wave which propagates in the line and is returned by the line to the gate conductor; the magnitude of the resistance of each said gate conductor when driven resistive being so related to the characteristic impedance of said line and the manner in which said gate conductor is connected in said line that when said gate conductor is driven resistive each wave propagated in said line from said gate conductor and returned by said line to said gate conductor is substantially terminated when it is returned to said gate conductor the first time whereby essentially the entire current from said source is switched from the path including the gate conductor driven resistive to the other path in the time required for the wave to be propagated from the gate conductor in the line and returned by the line to the gate conductor.

5. The circuit of claim 4 wherein the width of the portions of said planar strips forming said gate conductors is less than the width of the portions of said planar strips forming the transmission line in which said gate conductors cause said waves to be propagated.

6. The circuit of claim 4 wherein said first planar strip path includes a control conductor; said control conductor and second gate conductor being arranged symmetrically in said transmission line.

7. The invention as claimed in claim 4 wherein one of said gate conductors is so connected in one of said superconductive paths that it forms one end of said transmission line; said one gate conductor when it is driven resistive at a time when current from said source is directed therethrough causing a wave to be transmitted therefrom down said line and reflected back to said gate conductor; the magnitude of the resistance of said gate conductor being substantially equal to the characteristic impedance of said line.

8. The circuit of claim 4 wherein at least one of said gate conductors is so connected in said line that it is effective when driven resistive at a time when the current from said source is being directed therethrough to send two waves in opposite directions along said line; the magnitude of the resistance of said gate conductor being greater than the characteristic impedance of the line.

9. The circuit of claim 8 wherein the resistance of said gate conductor is substantially equal to twice the characteristic impedance of said line.

10. The circuit of claim 4 wherein each wave propagated down said line when a gate conductor is driven resistive at a time when the current from said source is directed therethrough has a current magnitude essentially equal to one half the magnitude of the source current.

11. A superconductor circuit comprising; a superconductive transmission line forming a closed superconductive loop; said transmission line having a predetermined characteristic impedance; a superconductive gate conductor connected in said loop; control means for driving said superconductive gate conductor into a resistive state; the resistance of said gate conductor when driven into a resistive state being substantially equal to twice the characteristic impedance of said transmission line.

12. In a superconductor circuit; a superconductive transmission line; means for producing current in said superconductive transmission line; a superconductive gate conductor connected in said superconductive transmission line; means for driving said gate conductor resistive at a time when said current is flowing therethrough; the resistance of said gate conductor being so related to the impedance of said transmission line and the position in which said gate conductor is connected in said line that it causes to be propagated in said line a wave having associated therewith a current essentially equal to one half the magnitude of the current flowing in the gate conductor at the time it is driven resistive.

13. In a superconductor circuit; a superconductive transmission line; means for producing current in said superconductive transmission line; a superconductive gate conductor connected in said superconductive transmission line; means for driving said gate conductor resistive at a time when said current is flowing therethrough; said gate conductor when it is driven resistive causing a wave having a current associated with it to be applied to each section of said transmission line extending from said gate conductor; said transmission line being so constructed that each wave applied to it by said gate conductor is propagated in said line and returned through said line to said gate conductor; the resistance of said gate conductor being such that each wave applied by it to a connected section of said transmission line has associated with it a current having a magnitude essentially equal to one half the magnitude of the current flowing in the gate conductor at the time it is driven resistive and each wave returned to said gate conductor by said transmission line is terminated at said gate conductor.

14. In a superconductor circuit of the type including first and second superconductive paths connected in parallel across a current source with each path including a superconductive gate conductor and each gate conductor being provided with control means for driving the gate conductor from a superconducting to a resistive state and thereby controlling the one of said paths in which the current from said source flows; said superconductive paths being in the form of a transmission line and each of said gate conductors being so connected in said transmission line that each time a gate conductor is driven resistive, at a time when the current from said source is flowing therethrough, a wave is propagated from the gate conductor along the line and returned through the line to the gate conductor; the magnitude of the resistance of each of said gate conductors being so related to the impedance of said line that substantially the entire current is shifted from the path including the gate conductor which is driven resistive to the other path in the time required for the wave to be propagated in said line and returned through the line to said gate conductor.

15. The circuit of claim 14 wherein the resistance of one of said gate conductors is substantially equal to the characteristic impedance of said transmission line.

16. A superconductor circuit comprising; a superconductive transmission line; a superconductive control conductor connected in said transmission line; a superconductive gate conductor connected in said transmission line; means for producing current in said transmission line which flows through said gate conductor; means for driving said gate conductor from a superconducting to a resistive state to change the current in the control conductor in said transmission line; said current change in said line being effected by waves which are propagated from said gate conductor along said line and returned through said line to said gate conductor; said waves passing through said control conductor; the magnitude of the resistance of said gate conductor being so related to the characteristic impedance of said transmission line that each of said waves has associated with it a current substantially equal to one half the current change to be effected in said control conductor.

17. The circuit of claim 16 wherein said control and gate conductors are symmetrically located with respect to each other in said line.

18. The circuit of claim 16 wherein said transmission line includes a group of control conductors in which the current is changed when said gate conductor is driven resistive; said control conductors in said groups being iteratively arranged in said line with the spaces therebetween being less than the wave length of the highest frequency associated with the waves which are propagated in said transmission line.

19. The circuit of claim 16 wherein said transmission line in which said control and gate conductors are connected includes a smooth section and the width of said gate conductor is less than the width of the smooth section of said line.

20. The circuit of claim 16 wherein said means for producing current in said transmission line comprise a current source connected to said transmission line; said transmission line forming two current paths in parallel with said current source; said gate conductor being connected in one of said current paths and said control conductor being connected in the other of said current paths; the resistance of said gate conductor being so related to the characteristic impedance of said line that when said gate conductor is driven resistive when the current from the source is flowing therethrough the entire current is switched from the path in which the gate conductor is connected to the other path in which the control conductor is connected in the time required for the propagation of a wave from said gate conductor through said line back to said gate conductor.

21. A superconductor circuit comprising; a superconductive transmission line forming a closed superconductive loop; a superconductive gate conductor connected in said loop; a control conductor for driving said superconductive gate conductor into a resistive state; the resistance of said gate conductor when driven into a resistive state being substantially equal to the impedance presented by said transmission line to said gate conductor when it is driven into a resistive state.

22. A superconductor circuit comprising; a superconductive transmission line; a superconductive gate conductor connected in said transmission line; means for producing current in said transmission line; a control conductor for driving said superconductive gate conductor into a resistive state to thereby produce a change in the current in said transmission line; the resistance of said gate conductor when driven into a resistive state being substantially equal to the impedance presented by said transmission line to said gate conductor when it is driven into a resistive state.

23. A superconductor circuit comprising; a superconductive transmission line; a superconductive gate conductor connected in said transmission line; a first superconductive control conductor connected in said transmission line; means for producing current in said transmission line flowing in said superconductive gate conductor; a further control conductor for driving said superconductive gate conductor from a superconductive to a resistive state to thereby shift current from said gate conductor to said first control conductor connected in said transmission line; the resistance of said gate conductor being so related to the impedance of said line that the major portion of current flowing in said gate conductor when it is driven resistive is shifted to said first control conductor in the time required for a wave to be propagated from said gate conductor through said line and returned to said gate conductor.

24. A superconductor circuit comprising; a superconductive transmission line; a superconductive control conductor connected in said transmission line; a first superconductive gate conductor arranged adjacent said control conductor and controllable between superconductive and resistive states in response to current in said control conductor; a further superconductive gate conductor connected in said transmission line; means for producing current in said transmission line which flows through said further gate conductor; means for driving said further gate conductor from a superconducting to a resistive state to change the current in said control conductor in said transmission line; said current change in said line being effected by waves which are propagated from said further gate conductor along said line and returned through said line to said further gate conductor; said waves passing through said control conductor; the magnitude of the resistance of said further gate conductor being so related to the impedance of said transmission line that a sufficient current change is effected in said control conductor to cause the state of said first gate conductor to be changed in the time required for a wave to be propagated from said further gate conductor along said line and returned through said line to said further gate conductor.

25. The circuit of claim 24 wherein the resistance of said further gate conductor is so related to the impedance of said transmission line that when said further gate conductor is driven resistive the initial wave propagated in said line through said control conductor is sufficient to cause the state of said first gate conductor to be changed.

26. A superconductor circuit comprising; a superconductive transmission line; a superconductive control conductor connected in said transmission line; first and second superconductive gate conductors each arranged adjacent a corresponding one of said first and second control conductors and each controllable between superconductive and resistive states in response to current in the corresponding control conductor; a further gate conductor connected in said transmission line; means for producing current in said transmission line which flows through said further gate conductor and said first control conductor whereby said first gate conductor is resistive and said second gate conductor is superconducting; means for driving said further gate conductor from a superconducting to a resistive state to change the current in said first and second control conductors in said transmission line; said current change in said line being effected by waves which propagate from said further gate conductor along said line and return through said line to said further gate conductor; said waves passing through said control conductors; the magnitude of the resistance of said further gate conductor being so related to the impedance of said transmission line that a sufficient current change is effected in said first and second control conductors to cause said first gate conductor to become superconductive and said second gate conductor to become resistive in the time required for a wave to be propagated from said gate conductor along said line and through said line back to said further gate conductor.

No references cited.

UNITED STATES PATENT OFFICE

CERTIFICATION OF CORRECTION

Patent No. 2,962,681 November 29, 1960

John J. Lentz

It is hereby certified that error appears in the above numbered patent requiring correction and that the said Letters Patent should read as corrected below.

Column 1, line 50, for "than" read -- that --; column 4, line 50, for "12" read -- 12a --; line 63 for "12" read -- 14 --; column 13, line 56, strike out "a".

Signed and sealed this 30th day of May 1961.

(SEAL)
Attest:

ERNEST W. SWIDER
Attesting Officer

DAVID L. LADD
Commissioner of Patents